US006043891A

United States Patent [19]

Hartrumpf et al.

[11] Patent Number: 6,043,891

[45] Date of Patent: Mar. 28, 2000

[54] SYSTEM FOR THREE-DIMENSIONAL MEASUREMENT OF INACCESSIBLE HOLLOW SPACES

[75] Inventors: Matthias Hartrumpf; Roland Munser, both of Karlsruhe, Germany

[73] Assignee: Fraunhofer Gesellschaft zur Forderung der angewandten Forshung e.v., Munich, Germany

[21] Appl. No.: 08/982,472

[22] Filed: Dec. 2, 1997

Related U.S. Application Data

[63] Continuation of application No. 08/586,723, filed as application No. PCT/DE94/00898, Jul. 29, 1994, abandoned.

[30] Foreign Application Priority Data

| | | | |
|---|---|---|---|
| Jul. 29, 1993 | [DE] | Germany | 43 25 542 |
| Mar. 22, 1994 | [DE] | Germany | 44 09 854 |

[51] Int. Cl.[7] .......... G01B 11/24

[52] U.S. Cl. .......... 356/376; 356/372; 356/379

[58] Field of Search .......... 356/376, 372, 356/379, 382

[56] References Cited

U.S. PATENT DOCUMENTS

| | | | |
|---|---|---|---|
| 4,784,463 | 11/1988 | Miyazaki | 356/241 |
| 5,052,803 | 10/1991 | Krauter | 356/241 |
| 5,195,392 | 3/1993 | Moore et al. | 356/241 |
| 5,424,836 | 6/1995 | Weise et al. | 356/376 |

*Primary Examiner*—Robert Kim
*Assistant Examiner*—Reginald A. Ratliff
*Attorney, Agent, or Firm*—Antonelli, Terry, Stout & Kraus, LLP

[57] ABSTRACT

A system for three-dimensional measurement of inaccessible hollow spaces (e.g. sewage canal pipes) by means of a light source and a camera, which are disposed on an inspection head or carrier. A structured light source is used, and the camera and the structured light source have a common entry and exit aperture and have before the aperture at least partially one common optical axis or parallel axes, the distance between which is substantially smaller than the distance between the source point of the pattern and the object-side principle plane of the camera lens.

32 Claims, 7 Drawing Sheets

SYSTEM FOR THREE-DIMENSIONAL MEASUREMENT OF INACCESSIBLE HOLLOW SPACES

CROSS-REFERENCE TO RELATED APPLICATIONS

This application is a continuation of application Ser. No. 08/586,723, abandoned which is U.S. Nat'l stage application of PCT/DE94/00898 filed Jul. 29, 1994.

FIELD OF THE INVENTION

The present invention relates to a system for three dimensional measurement of inaccessible hollow spaces.

BACKGROUND ART

In many cases remote-controlled camera-vehicles are used to inspect inaccessible hollow spaces respectively for small hollow spaces endoscopes. Since more inexpensive and more efficient image-processing systems have become available, inspection systems have increasingly been equipped with image-processing systems in order, on the one hand, to assist the operator in visually examining the hollow space and, on the other hand, for (semi) automatically measuring the hollow spaces. As the primary aim largely determining the setup of the optical system (camera and illumination) is to assist the operator, the conventional devices on the market are illuminated with constant, unstructured light.

Completely, three-dimensional measurement of the inspected hollow spaces by means of camera images would require, as is known, either illumination with structured light or a second camera (stereo vision system). Furthermore, in order to achieve desired measurement accuracy, the known processes require that the components be spaced a minimum distance apart perpendicular to the inspection direction. Besides interfering with the operator's visual inspection, the use of known 3D-optical measurement procedures is usually out of the question solely because of the needed room.

In many inspection vehicles, the cameras are located on a pan-and tilt-head. The orientation of the axis of the camera occurs by rotation about the axis of the camera and about an axis running perpendicular thereto. Contrary to the usually employed orientation of the human eye by means of two rotations of the head about axes running perpendicular to the mean axis of the eye, a combination of these camera rotations ultimately yields an image of the inspection site turned about the horizon. According to the state of the art (printed German patent DE 30 19 339 C1) this rotation can be compensated by a counter rotation of the sensor element in the camera.

The following problems are encountered. In order to also permit measurement of the depth of the hollow space with one of the conventional inspection systems, as mentioned above, either a stereo-vision system or an additional source of structured light that can be switched on is disposed on the endoscope or camera vehicle, because a more or less large volume of the object space is imaged in the image plane of a lens due to the depth of sharpness of the image. An object-plane-cutting volume in the form of a truncated pyramid is assigned to each image element (pixel). Therefore, without any additional measurements, using solely a camera permits only very inaccurate measurement of the dimensions. There is no calibration of the detected structures with the imaging ratio.

A section of an image in the X-Z-plane (cf. FIG. 1 and equation {1}) makes this more apparent. Point P with the coordinates (X,Z) is imaged with a lens of focal length f onto an image point B with the coordinates (x,z). The imaging equations (taking into account image reversal by means of a suitable selection of x, z measurement coordinates) yields: $X=x\ (Z/f-1)$ {1}, i.e. without knowledge of the object distance Z, the distance X of the point P from the optical axis cannot be determined.

Simple distance sensing (by way of example, using proximity detectors) can in some circumstances only occur for plane structures which are situated in a plane lying parallel to the image plane. For other objects, the distance of the single image points usually is determined by means of light section procedures or stereo cameras. These procedures are based on an assessment of the parallax of two optical systems (2 cameras or a structured light source and a camera). FIG. 2 shows the simplest example for demonstrating the principle of the light section procedure, the image of an object point illuminated by a laser beam. For the illuminated object point then applies, in addition to the imaging condition {1}, that it is cut by the illumination beam path. The laser beam intersects the optical axis at point (0,a) at an angle of w. Observation of the (X-Z) plane yielded by the optical axis and the laser beam suffices. For imaging using the lens, imaging condition {1} applies and the intersection of the object point with the illuminating laser beam yields: $X=Z\cdot\tan(w)-b$ {2} or $X=(Z-a)\tan(w)$ {3}. In the case of the known light section procedures, the intersection point of the illuminating pattern with the principle plane of the lens is used as the reference point (b,0). Then the coordinates (X,Z) of the point P are yielded by the x-coordinate measured in the image plane, the beam angle w and the known focal distance f according to:

$$X=x(f\cdot\tan(w)-b/(x-f\cdot\tan(w)) \quad \{4\}$$

and $$Z=f\cdot(x-b)/(x-f\cdot\tan(w)) \quad \{5\}.$$

Usually it is not sufficient to only measure one point in the projected plane. Therefore, usually a line or a light structure directed to the measured object is projected. In systems according to the state of the art, the structure projector is located at a distance b from the camera. For applications in which only very compact measurement systems can be utilized, such as, by way of illustration, probes for examining pipes, in the case of the known light section systems the structure projector cannot be attached in the center. As the following plane case shows in a simple manner, this system has considerable drawbacks, in particular in examining cylindrical hollow spaces or in inspecting pipes. In this simple instance, the structure projector emits two laser beams at an angle of w=±wl to the optical axis. FIG. 3 shows the setup. The beam courses and the imaging condition yield the equations {6} and {7} for calculating the coordinates (X,Z) of the light section points from the values of the x-coordinates measured in the image plane:

$$X=b/2+(f\cdot\tan(w)\cdot(x+b))/(x-f\cdot\tan(w)) \quad \{6\}$$

and $$Z=f\cdot(x+b)/(x-f\cdot\tan(w)) \quad \{7\}:$$

If the to-be-measured nominal width region of the pipe or the shape and size of the to-be-measured hollow spaces is not very restricted, so that illumination with an adapted pattern (respectively optical axes of illumination and camera that are slanted toward each other) can be carried out, diagonal sections in the pipe or hollow space are measured (cf. FIG. 3). Consequently the side lying closest to the structure projector is measured with great accuracy (as the measuring points are not far from the camera), whereas the opposite side of the pipe, in which the measuring points are situated at much greater distance from the camera, is measured with less measurement accuracy. Frequently the extreme situation occurs in which parts of the light section lie beyond the zone of sharp focus of the image, i.e. they cannot be measured at all.

The measurement errors $\sigma_x$ of the x-coordinate (in the image plane) result in the measurement errors $\sigma_X$ and $\sigma_Z$ of the object coordinates X,Z given in the equations {8} and {9}:

$$\sigma_x=|(f\cdot\tan(w)\cdot(b+f\cdot\tan(w))\cdot\sigma_x/(x-f\cdot\tan(w))^2| \quad \{8\}$$

and $$\sigma_z=|f\cdot(b+f\cdot\tan(w))\cdot\sigma_z/(x-f\cdot\tan(w))^2| \quad \{9\}.$$

As the calculation of a typical course of an error of the Z-coordinate determination shows (cf. FIG. 4A), the precision of the Z-coordinate measurements in the left (broken lines) and in the right (uninterrupted line) beam path varies. Moreover, the course of measurement accuracy of the X-coordinate determination (cf. FIG. 4B, bottom), shows that with measurement systems of this type, the greatest measurement accuracy is achieved directly in front of the camera and the structure projector. The measurement accuracy in the regions not directly in front of the camera is considerably lower.

However, exactly in these outside regions lie the regions (|X|>b/2) that are of interest in the inspection of hollow spaces such as pipes or inspection with endoscopes, whereas the regions in which the standard light section procedures provide the greatest measurement accuracy partially permit no section with the structured light at all (due to the geometry of the objects to be measured). Therefore, with these procedures only relatively inexact measurements can be carried out in the pipes or similar hollow spaces.

Moreover, when examining pipes with these measurement procedures, there are relatively great differences in intensity in the projected light section, and the calculation of the coordinates of the object is relatively complicated. Illuminating the pipe with a conical light structure in the system shown in FIG. 3 results in, by way of illustration, the equations {10} to {12} for calculating the coordinates X,Y,Z (for comparison see the calculation for an invented system shown in the following equations {13} and {14}):

$$X = x\cdot\frac{x\cdot b+\tan^2(w)\cdot f^2\pm\sqrt{\tan^2(w)\cdot f^2\cdot(y^2+(x+b)^2)-y^2\cdot b^2}}{y^2+x^2-\tan^2(w)}-\frac{b}{2} \quad \{10\}$$

$$Y = y\cdot\frac{x\cdot b+\tan^2(w)\cdot f^2\pm\sqrt{\tan^2(w)\cdot f^2\cdot(y^2+(x+b)^2)-y^2\cdot b^2}}{x^2+y^2-\tan^2(w)} \quad \{11\}$$

$$Z = f\cdot\frac{x^2+x\cdot b+y^2\pm\sqrt{\tan^2(w)\cdot f^2\cdot(y^2+(x+b)^2)-y^2\cdot b^2}}{x^2+y^2-\tan^2(w)} \quad \{12\}$$

In the known systems, both the optical systems are disposed side by side and the optical axes of the systems have at least one oblique angle to this distance. In order to achieve the desired measurement accuracy, it is absolutely necessary to maintain a minimum distance between the components of the system, i.e. an extension of the systems in the direction perpendicular to the inspection direction. Accordingly, these systems can only rarely be utilized for inspecting the interior of objects having little light width (pipes, vessels, small hollow spaces, etc.).

In the three-dimensional measurement of hollow space geometry, there are different problems for both systems (stereo-vision system, camera and structured illumination), especially if modification of the rotation position of the camera image is compensated according to the state of the art.

For a system comprising a camera and a structured illumination, resolution accuracy of the individual coordinates is limited by the distance between the camera and the structured illumination. In order to ensure as simple as possible operation of the apparatus, the camera usually is disposed in the center. In this way the distance between the camera and the structure projector (which limits measurement accuracy) is limited to half of the maximum possible value (diameter of the inspection system), i.e. accuracy is additionally limited. Furthermore, when hollow spaces with curved boundaries are inspected with such a system, due to the source point of the illuminating pattern being located outside the axis, there are variations in pattern between the illuminating pattern and the pattern visible on the wall of the hollow space, as well as between these two and the projected image. For this reason, in order to determine the coordinates of the pertinent structures of the object, complicated calculations of the coordinate transformations and form transformations between the illuminating structure, the structure projected on the object, and the structure seen with the camera are necessary. The position of the distance between the camera and the light source in the space are taken into account in these structure transformations. Furthermore, this distance causes the projected pattern to shift on the camera image, the size of which depends on the distance and the angle of the inspection system to the wall of the hollow space. The known method of simplifying the calculation of object coordinates from a camera image is illumination with a pattern adapted to the geometry of the object to be measured. It cannot be used with these procedures due to the distance and angle-dependent shift of the projection of this pattern.

If, in addition, a system for compensating the angle between the image of the camera and the horizon is utilized, the rotation of the image of the camera and the illuminating structure (i.e. the compensation angle) has to still be taken into account in the calculation of the structure transformation.

On the other hand, in a stereo vision system, it has to be taken into account that the position of the camera going into the calculation of the depth data changes spatially due to the rotation of the pan-and tilt-head. Calculation complexity in determining the object coordinates continues to increase if the images of the camera are equipped according to the state of the art with a compensation of the image position in relation to the horizon.

SUMMARY OF THE INVENTION

The object of the present invention is to create a system for three-dimensional measurement of inaccessible hollow spaces with which a considerably simplified measurement can be conducted compared to the prior art. This object is achieved according to the present invention by means of advantageous embodiments of the present invention set forth hereinafter.

The fundamental concept of the present invention is to make the average axis of the inspection system or the average normal of the platform tilted and swiveled with the pan-and tilt-head coincide either with the (average) axes of the camera and the emitted structured illumination, or the axes of two cameras and, if need be, to conduct the necessary compensation of the rotation position of the image or the images with a rotatable optical element disposed in the beam path. This optical element is designed in such a manner that rotating it results in rotation of the position of the image plane about the optical axis. Examples of such elements are systems of single prisms (e.g. Pechan prism, Dove prism or Abbe-König prism) or systems of cylindrical lenses.

In a system in accordance with the present invention for conducting the measurement procedure, the optical axis of the camera can be placed with one or multiple beam splitters virtually on the axis of the structure projector. If the latter projects a light pattern (by way of illustration conical) which is symmetrical to its axis and the system is guided in the center of the pipe (i.e. the optical axes of the camera and the projector are situated in the axis of the pipe), a section perpendicular to the pipe axis is measured. In the case of a cylindrical pipe, all the points on the circular section are measured with the same accuracy. All the points of intersection can be imaged equally sharply on a sensor element (e.g. a CCD matrix) and have in the case of a homogeneous surface the same intensity, provided that the structure projector and the imaging are of suitable quality.

As the principle of the procedure shown in FIG. 5 makes apparent, a system in accordance with the present invention is symmetrical in relation to the (usually average) longitudinal axis of the inspection probe or the normal to the swiveled and tilted platform. This symmetry results in a considerably simplified transformation of the coordinates between the measurement coordinate system, which is given by this platform and the normal to it, and the outer target coordinate system (e.g. the coordinate system used for the cartography of the channel). As the system is rotationally symmetrical, it suffices to view the light section from a point having the coordinates (R,Z) in the plane yielded by the optical axis and the distance of the measuring point to this axis. The zero point of this system of coordinates lies in the principle plane of the lens, and the source point of the pattern (point of intersection with the optical axis of the camera) lies at (O,a) (cf. FIG. 5). Calculation of the coordinates is conducted according to the equations {13} and {14}:

$$R=(r\cdot\tan(w)\cdot(f-a))/(r-f\tan(w)) \quad \{13\};$$

$$Z=f\cdot(r-a\tan(w))/(r-f\cdot\tan(w)) \quad \{14\}.$$

In accordance with the equations {13} and {14}, the error $\sigma_r$ of the measurement of r yields the following errors $\sigma_Z$, $\sigma_R$ of the measured coordinates of the object:

$$\sigma_R=|(a-f)\cdot f\cdot\tan^2(w)/(r-f\cdot\tan(w))^2|\cdot\sigma_r \quad \{15\}$$

$$\sigma_z=|(a-f)\cdot f\cdot\tan(w)/(r-f\cdot\tan(w))^2|\cdot\sigma_r \quad \{16\}$$

FIGS. 6A and 6B show a comparison of the measurement accuracy of the procedure from FIG. 3 (uninterrupted and broken curves (cf. FIGS. 4A and 4B)) with the measurement accuracy of a comparable procedure in accordance with the present invention (dotted line). In each case a reference length of 2·f or a point of intersection (0,0,−2·f) was assumed as well as a beam angle of w=±30°.

As the courses of measurement accuracy toward the radius and toward the distance in direction of the optical axis illustrated in FIGS. 6A and 6B show, measurement accuracy is symmetrical in relation to the optical axis R=0 and with corresponding dimensioning of the system, especially if the distances of the points of measurement to the optical axis are long, better than the accuracy achievable with the known procedures.

A further special advantage of the procedure is yielded by the transverse distance of the structured illumination and the camera not being decisive for measurement accuracy, but rather the distance in the direction of the optical axis. Measurement systems based on this process can therefore be realized with a minimal diameter and are for this reason especially suited for inspecting the interiors of objects having little clear width (typical applications of pipe probes and endoscopes).

Furthermore, in a system in accordance with the present invention composed of a structured light source and a camera, differences between the shape of the detected pattern and the illuminating pattern can be traced back to only the course or the shape of the wall of the hollow space relative to the center of the inspection head, whereas the size of the detected pattern is only dependent on the distance of this wall to the inspection head and the known distance between the camera and the illumination. If the optical axes of the illumination and the camera coincide exactly, the central point of the illuminating pattern and the central point of the camera image always lie fixed in relation to each other. There is no shifting of the central point in dependence on the distance to the wall of the hollow space, i.e. the appropriate selection of the illuminating pattern can greatly simplify image evaluation and interpretation.

If compensation of the rotation position of the camera image in accordance with the present invention is carried out by a means of a rotatable optical element disposed between the beam splitter and the hollow space section to be inspected, it is ensured additionally that the relative position of rotation between the illuminating and the detected pattern is constant. Even without knowing the swivel angle, tilting angle or compensation angle, the three dimensional measurements of the imaged hollow space can be carried out in the system of measurement coordinates, i.e. evaluation of the camera image is further simplified.

A system in accordance with the present invention having two cameras which lie virtually on the same optical axis through use of beam splitters also yields a simplified calculation of the coordinates of the object compared to the known procedures based on stereo evaluation assessment. A system in accordance with the present invention having two cameras is shown in FIG. 7. An object point (R,Z) is projected by the lens having the focal distance f or f2 onto the sensor element of camera 1 or 2.

The conditions of the imaging $$R=r\cdot(Z/f-1) \quad \{17\}$$

or $$R=r\mathbf{2}\,(Z\mathbf{2}/f\mathbf{2}-1) \quad \{18\}$$

and the condition Z2=Z+a{19} yield the equations {20} and {21} for the calculation of the coordinates of the object:

$$R=r2\cdot r\cdot(f+a-f2)/(f2\cdot r-r2\cdot f) \quad \{20\}$$

and $$Z=f\cdot(r2\cdot(a-f2)+f2\cdot r)/(f2\cdot-r2\cdot f) \quad \{21\}.$$

If the cameras are attached on a pan-and tilt-head and if compensation of the rotation position in accordance with the present invention is utilized, the evaluation of these images is further greatly simplified compared to a stereo camera according to the state of the art, as taking into account three different rotations is obviated (rotation of the image positions of the cameras, rotation of the distance of the camera about the normal on the swiveled and tilted platform).

The measurement process is tolerant in relation to small distances between the optical axes. The advantages of a measurement process in accordance with the present invention are, with few restrictions, at hand if the optical axes of the components of the system (structure projector and camera or two cameras) are parallel and the distance between the two is much smaller than the distance required for reaching the measurement accuracy ("effective distance a"). In a system in which the thickness of the lenses or of the camera lenses built of single lenses is not negligibly small, this effective distance a is the projection of the distance of the object side principle planes of the effective camera lenses onto the optical axis or the corresponding projection of the distance between the object side principle plane of the effective camera lens and the source point of the projected pattern.

In a further improvement of the present invention illustrated in FIG. 8 a beam splitter (13) is disposed between the camera and the entry optics or a beam splitter (8) is disposed between the optical element (7) for rotating the image position and the camera. The structured illumination coming from the partial beam path (b) or (e) reaches the common entry and exit aperture (5). In the case of the illumination having a rotationally symmetrical light structure, both systems are equivalent. Both systems differ if rotationally symmetrical light structures are not projected, the carrier (4) is rotated about the optical axis (f), and the image position is corrected. Then as a result:

in the event of beam splitting, in which the structured light source reaches via a beam splitter (13), the common optical axis (f), and the exit aperture (5), the projected light structure is rotated whereas in the event of beam splitting in which the structured light source reaches via a beam splitter (8), the common axis (b) and (f), and the exit aperture (5), this rotation is also compensated for.

Furthermore, under these conditions the optical axes of the camera and structured illumination in the common beam path can be brought to coincide in such a manner that in the event that the hollow space shifts toward the pan-and tilt-head, the center point of the projected pattern does not shift toward the camera image.

In another improvement the losses in intensity occurring at the beam splitters (8) or (13) are minimized. The linearly polarized light coming from the structured light source arrives with corresponding orientation direction of the polarization direction relative to the beam splitter practically unweakened by this beam splitter. If further along the beam path to the object and from it back to the polarizing beam splitter, there is no rotation of the polarization direction, an illumination of the hollow space having circularly polarized structured radiation is achieved by way of illustration with a suitably aligned quarter-wave plate. The beam coming from the hollow space is then also circularly polarized and is then linearly polarized in passing through the delay element in such a manner that it passes the beam splitter in direction to the camera practically unweakened.

With a further improvement according to the present invention, a third partial beam path (g) can be generated by means of another beam splitter (6) and can be detected by another camera. This camera can be utilized to assist an operator who can use the images recorded in this manner for visual inspection and for maneuvering the carrier or the camera vehicle through the hollow cavity.

Particularly low-loss beam separation can be achieved if this beam splitter selectively divides the incoming beam wavelengthwise into the partial beam paths (g) and (b). If this beam splitter is, by way of illustration, dimensioned in such a manner that only radiation from a narrow spectral range about the wavelength of the narrow-band radiation of the structured illumination is reflected into the partial beam path from the beam splitter in the direction of the structured light source or back, in this manner a maximum of the incoming radiation originating from a white light illumination (not shown in FIG. 8) enters the other partial beam path. The light patterns generated on the hollow space by the structured illumination are practically invisible in this partial beam path, i.e. the camera image corresponds practically to the image obtained using a hitherto conventional inspection system. In the other partial beam path, on the other hand, is present almost only the radiation resulting from the structured illumination of the object, i.e. the pattern created on the object by means of the structured illumination can be projected with maximum contrast.

A simplified invented stereo image evaluation can be conducted with another improvement according to the present invention. Particularly simplified image evaluation calculations can be obtained with the following special cases (cf. equations {20} and {21}:

1. Special case: a≠O; f=f2, (r2≠r)

$$R=a\cdot r2r/f\cdot(r-r2) \quad \{22\}$$

and $$Z=r2\cdot(a-f)+f\cdot r/(r-r2) \quad \{23\}$$

2. Special case: a=O; f≠f2, (r2≠r)

$$R=r2\cdot r\cdot(f-f2)/(f2\cdot r-r2\cdot f) \quad \{24\}$$

and $$Z=f\cdot f2\cdot(r-r2)/(f2\cdot r-r2\cdot f) \quad \{25\}$$

If one of the effective focal lengths can be adjusted, the result is further simplified calculation of the coordinates of the object, if the focal length(s) are adjusted in such a manner that r=r2 applies. The result for the object coordinates (R,Z) is:

$$R=r\cdot(a/(f2-f)-1) \quad \{26\}$$

and $$Z=f\cdot a/(f2-f) \quad \{27\}$$

The use of deflection elements such as mirrors or prisms permits folding the beam paths, and spatial extension of the entire system is optimized.

The use of imaging optical elements (e.g. lenses, concave mirrors, paraboloidal mirrors) in the beam paths permits optimizing the optical properties (e.g. depth of focus, effective focal lengths of the individual cameras, radiation characteristics of the structured illumination, wavelength range of the wavelength selective beam splitter, effective distance between the structured light source and the camera or the individual cameras).

If the carrier (4) is disposed on a rotatable pan or pan-and tilt-head, the entire system can be aligned to different sections of the hollow space.

Especially advantageous is rotating of the image according to the present invention if additional sensors, such as by way of illustration ultrasound sensors, are disposed on this carrier or are disposed in such a manner that they can rotate with it. They can be aligned in such a way that they only cover a limited angle range of the hollow space and rotate with the carrier. By means of this rotation movement, the sensors can scan the entire hollow space or individual sections of the hollow space and in this way carry out resolved measurements in relation to the angle. If compensation of the rotation movement resulting from the position rotation of the video images in accordance with the present invention is carried out, this angle scanning can occur without impairment to the optical measurement or the visual inspection.

Due to the mentioned properties of three dimensional measurements in accordance with the present invention, the described systems are especially suited for inspecting waste disposal pipelines such as sewage canals, for inspecting supply lines and for use in endoscopes.

DETAILED DESCRIPTION OF THE INVENTION

Figure 1:
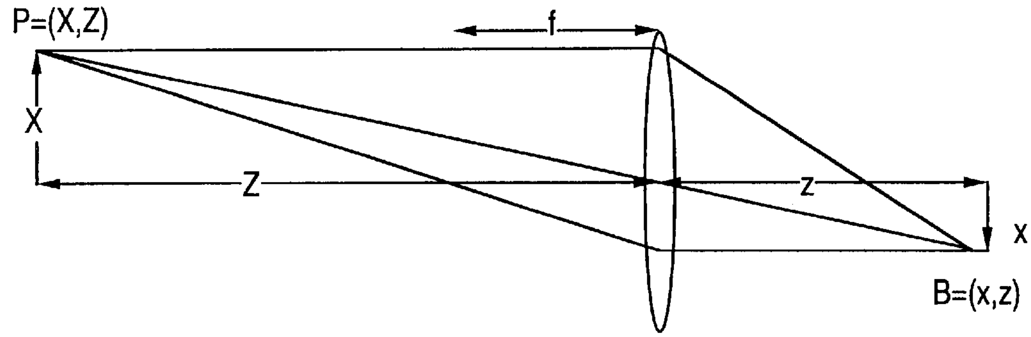
FIGS. 1–3 are schematic illustrations of prior art systems.
Figure 2:
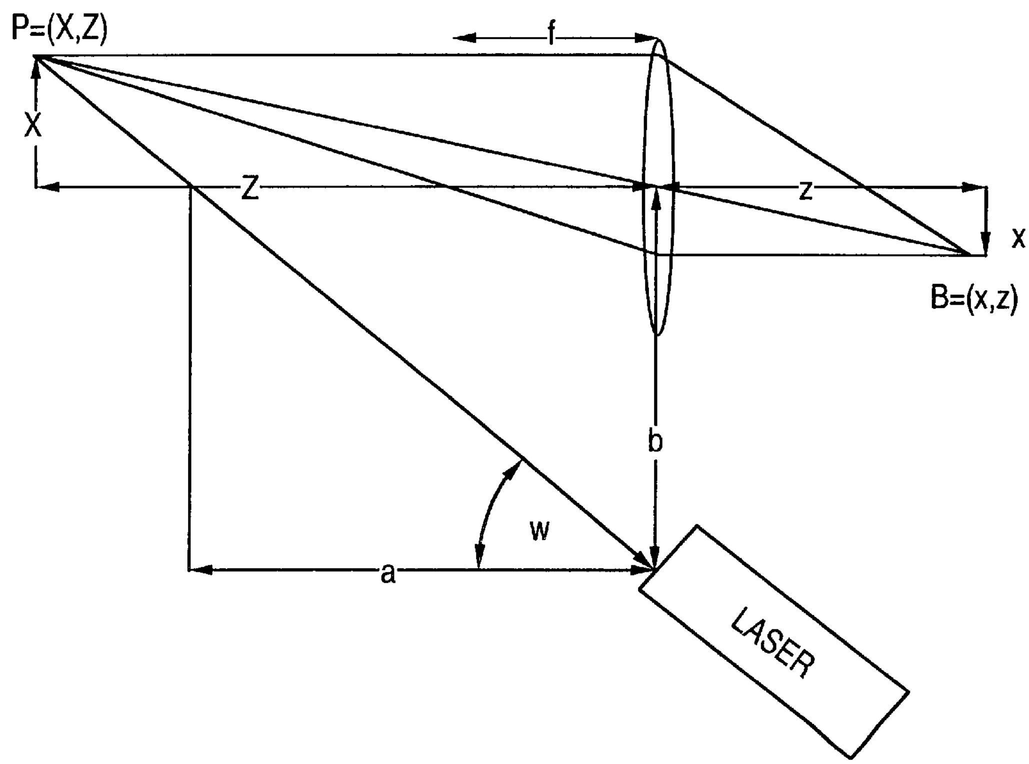
Figure 3:
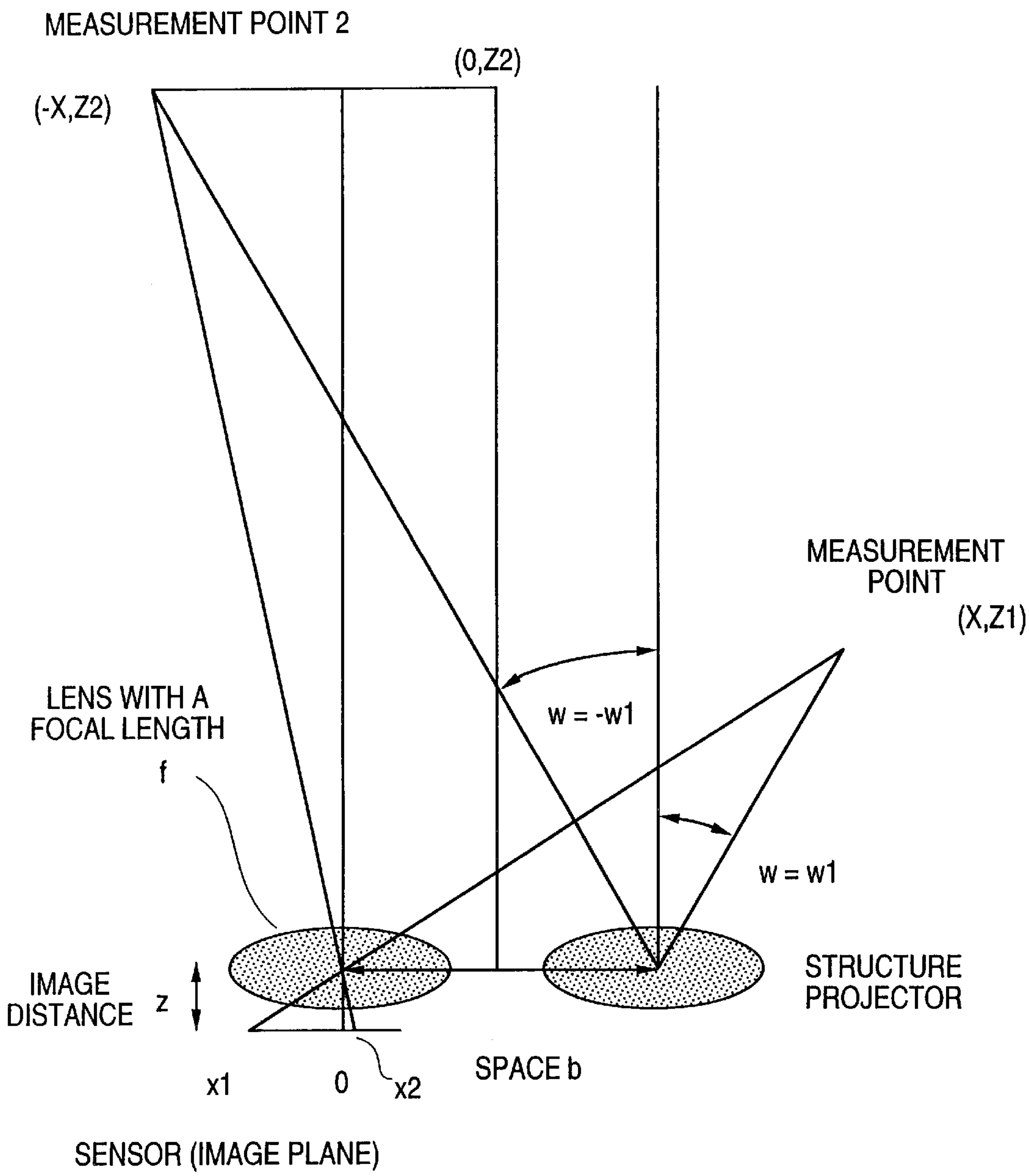
Figure 4A:
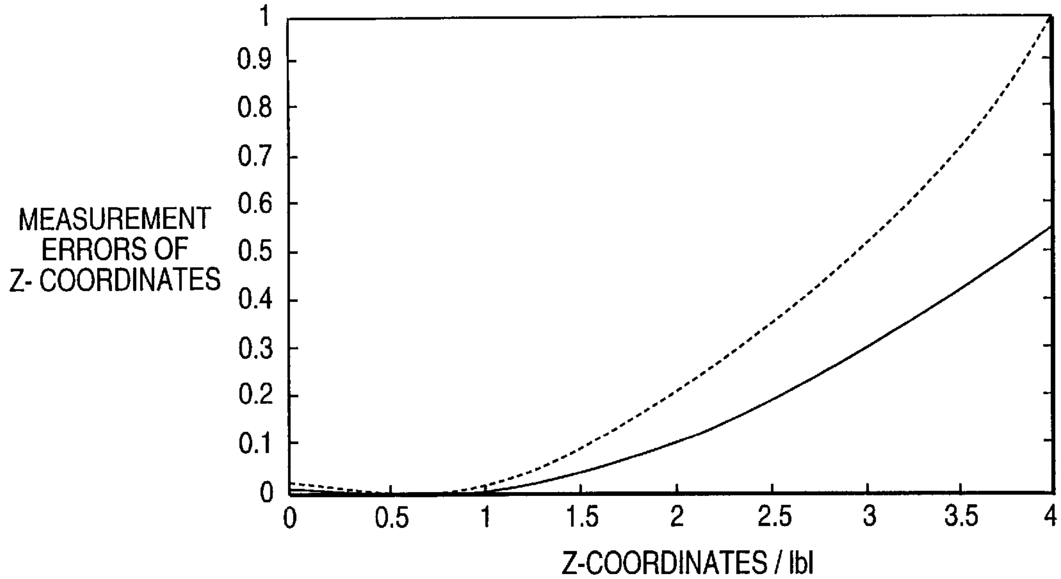
FIGS. 4A and 4B are graphs depicting operation of prior art systems.
Figure 4B:
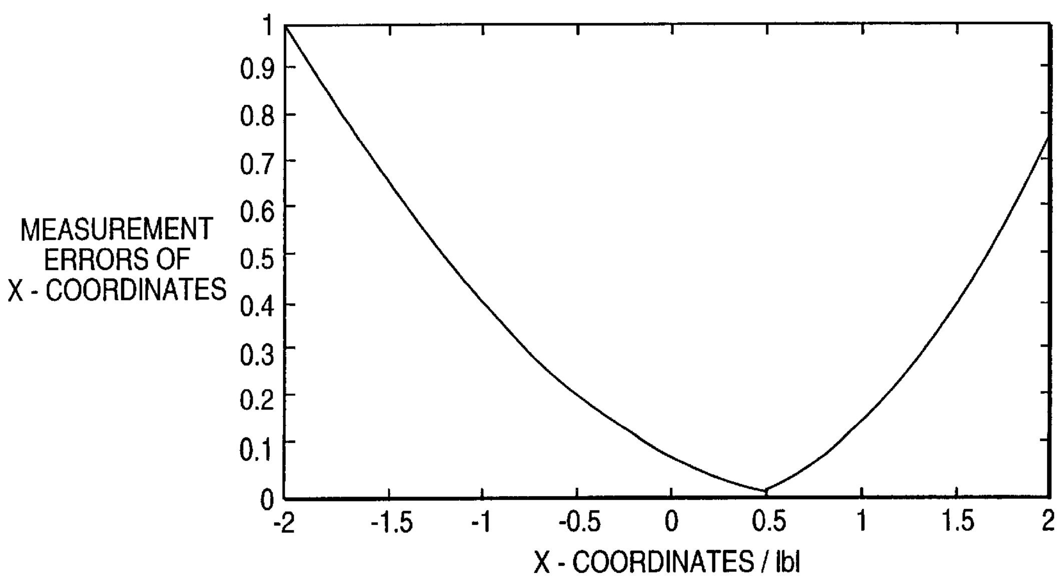
Figure 5:
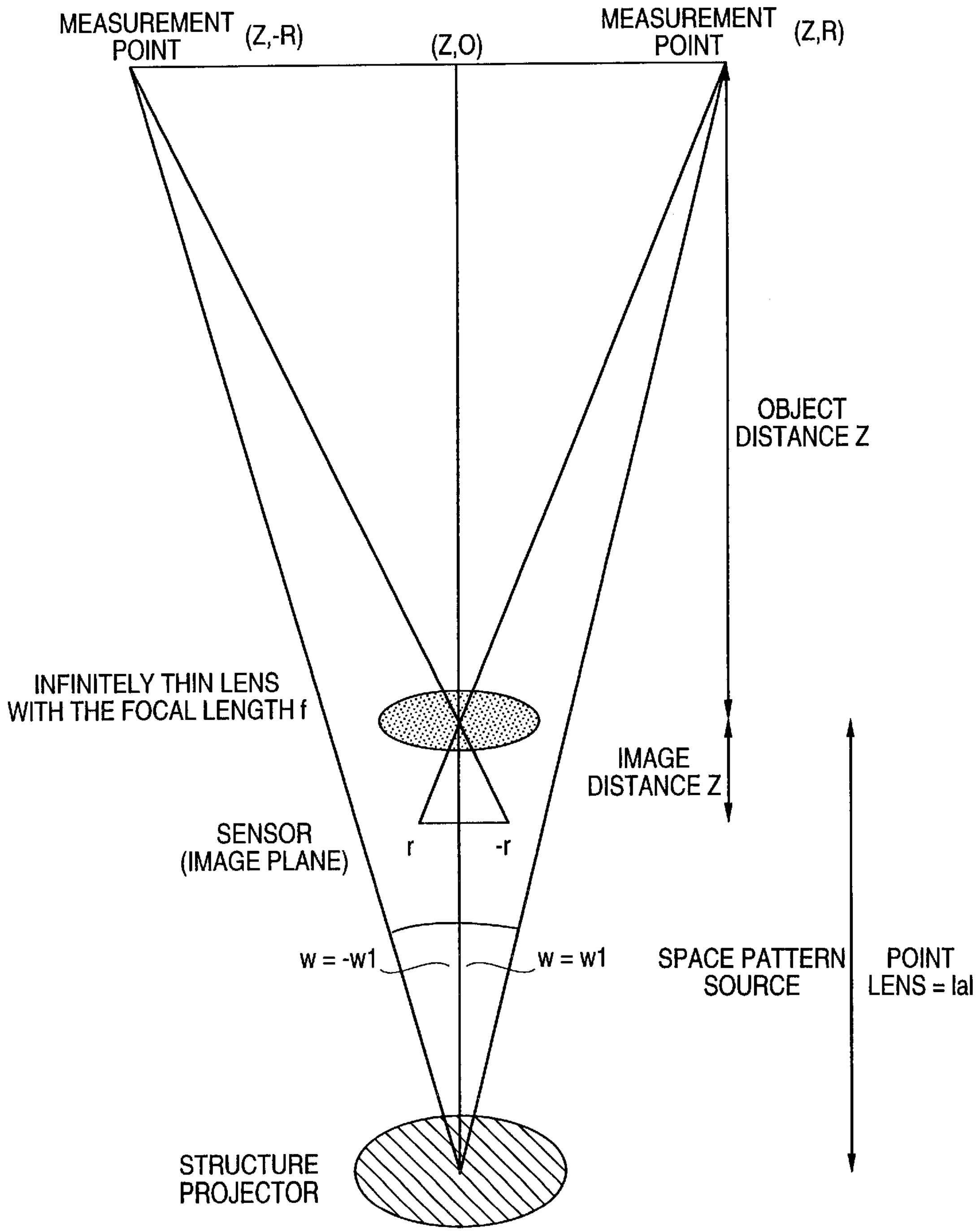
FIG. 5 is a schematic illustration of a first embodiment of a system in accordance with the present invention.
Figure 6A:
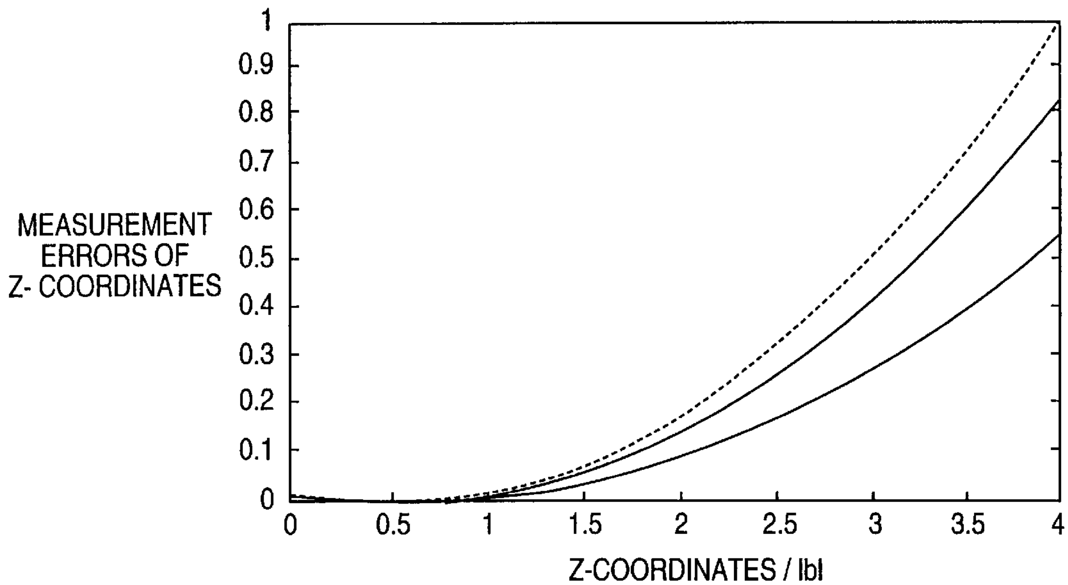
FIGS. 6A and 6B are graphs depicting operation of the embodiment of FIG. 5.
Figure 6B:
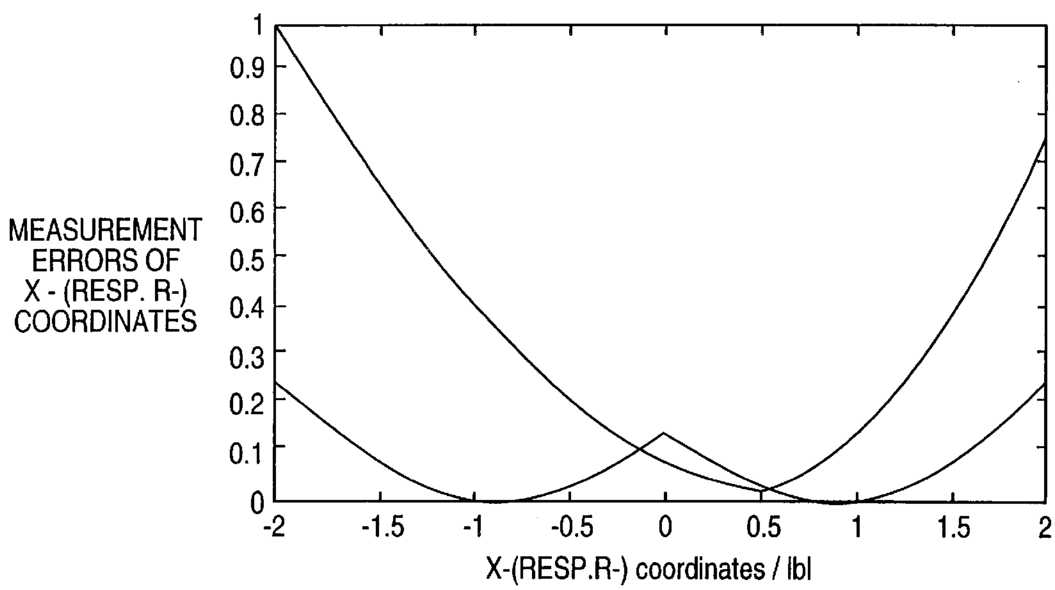
Figure 7:
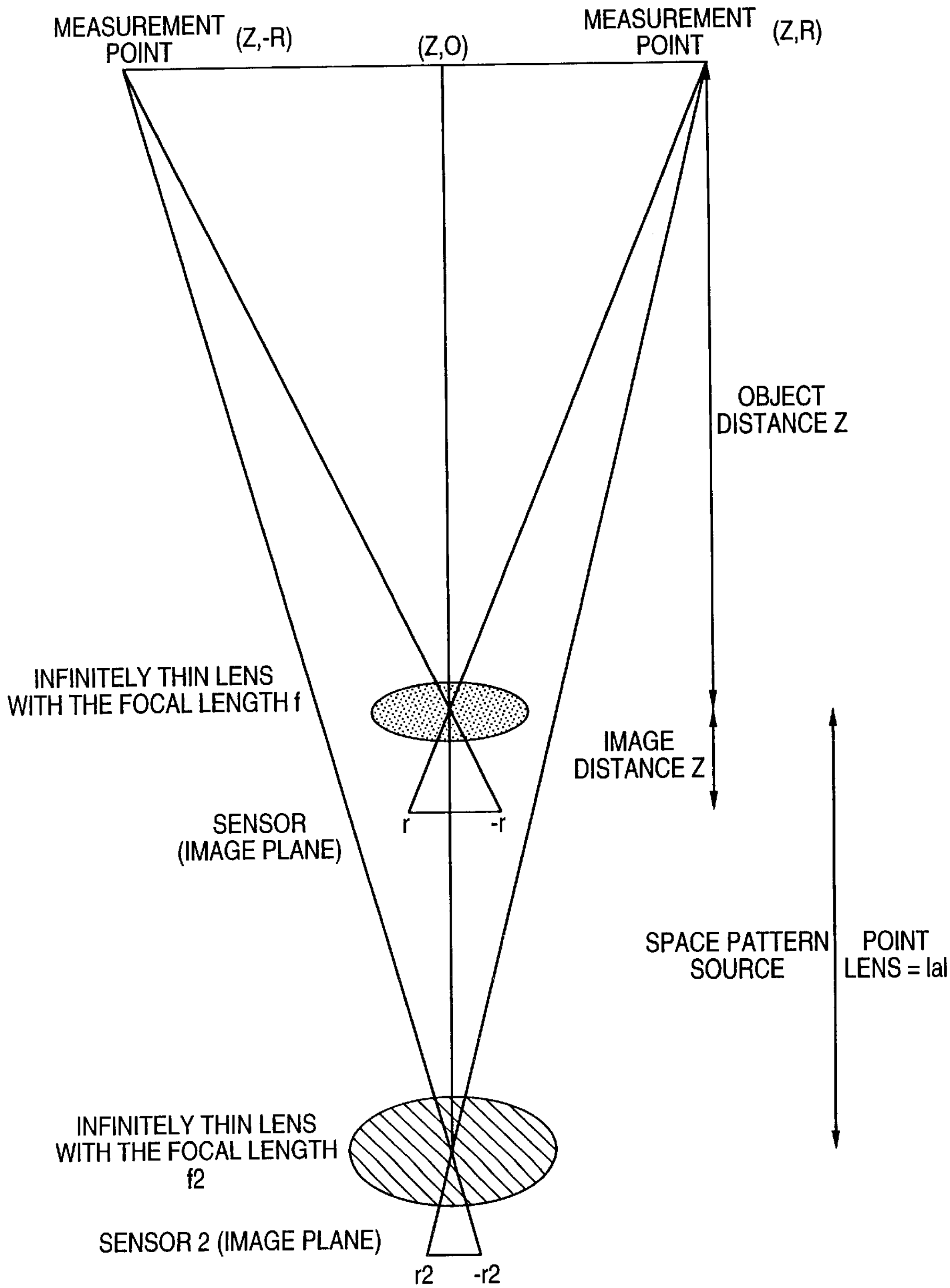
FIG. 7 is a schematic illustration of a second embodiment of a system in accordance with the present invention.
Figure 8:
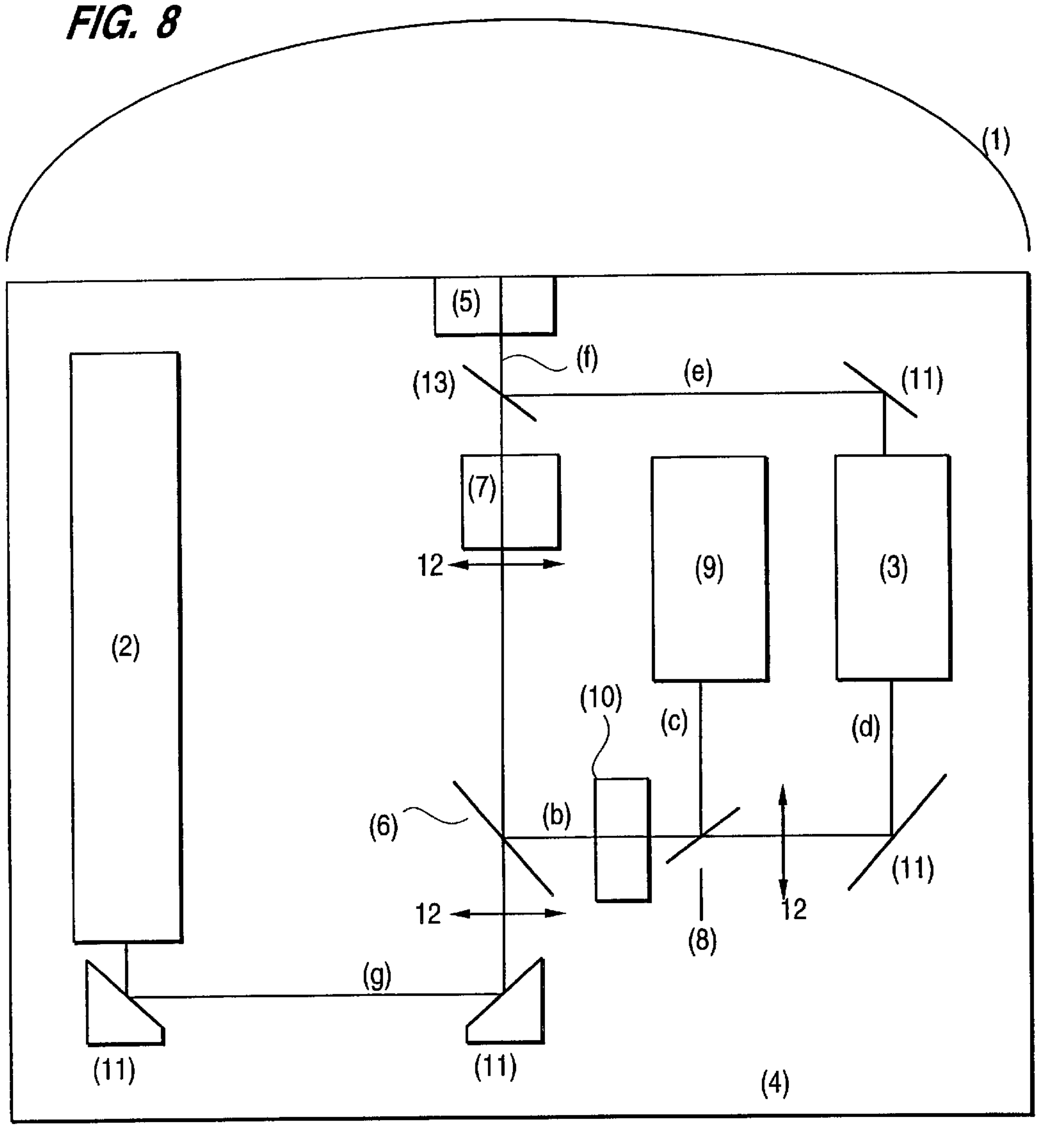
FIG. 8 is a schematic plan view of a preferred embodiment of the present invention.

An embodiment of the present invention is made more apparent from FIG. 8 which shows a view of a plane system of the optical elements on a common carrier (e.g. the platform of a pan-and tilt-head) (4).

In FIG. 8, (d) stands for the partial beam path of the structured, polarized and narrowband light source (3) via a mirror (11) and a lens (12) to the polarizing beam splitter (8). With suitable alignment of the polarization direction of this beam splitter, the structured illumination reaches the quarter-wave plate (10) practically unweakened. The radiation reaching from there to a wavelength selective beam splitter (6) is, with corresponding alignment of the quarter-wave plate, circularly polarized and reaches the optics or aperture (5) via a lens (12) and, if desired, via a rotatable Pechan prism or Dove prism (7), and from there to the to-be-measured section of the hollow space (1). The light pattern created there and the radiation coming from there reach, via the optics or the aperture (5), the rotatable Pechan prism or Dove prism (7) if desired, lens (12), and the wavelength selective beam splitter (6). With the exception of the radiation from a narrow spectral range of about the wavelength of the structured illumination, the radiation coming from the hollow space passes through this beam splitter practically intact into the partial beam path (g), via a lens (12) and two prisms (11) which turn the beam path onto a (color) camera (2). The circularly or elliptically polarized radiation coming from the light pattern generated by means of the structured illumination reaches the polarizing beam splitter in the partial beam path (b) through the quarter wave plate. It is polarized behind the quarter wave plate practically in a direction perpendicular to the radiation, coming from the structured illumination, running through in the opposite direction and is therefore practically completely directed from the polarizing beam splitter (8) into the partial beam path (c) to the camera (9).

Principally equivalent to reflecting by means of the mirrors the structured illumination via the partial beam paths (d) and (b) onto the common optical axis (f) is, if using a rotationally symmetrical light structure, reflecting the structured illumination via the partial beam path designated (e), the mirror (11), and the beam splitter (13). The delay element (10) is obviated in this solution variant, and the beam splitter (8) can reflect all of the radiation coming in the partial beam path (b) to the path (c) and onto the camera (9).

What is claimed is:

1. A system for three-dimensional measurement of objects in an inaccessible hollow space, comprising a light source; a camera having a lens; and a carrier having said light source and said camera fixedly mounted thereon to prevent relative movement between said light source and said camera, said carrier having an aperture for exiting of light from said light source to an object to be measured and entry of images of the object to be measured, wherein:

said light source provides light to an optical path directed to said aperture and over at least a portion of said optical path coincident with an image path from said aperture to said camera lens, or aligned parallel to said image path at a distance substantially smaller than the distance between said aperture and said camera lens.

2. A system for three-dimensional measurement of objects in an inaccessible hollow space, comprising a light source; a first camera having a first lens; a second camera having a second lens; and a carrier having said light source, said first camera and said second camera fixedly mounted thereon to prevent relative movement between said light source and said cameras, said carrier having an aperture for exiting of light from said light source to an object to be measured and entry of images of the object to be measured, wherein:

said light source provides light to an optical path directed to said aperture, and at least a portion of a first image path from said aperture to said first camera and at least a portion of a second image path from said aperture to said second camera are coincident with or are aligned parallel to each other at a distance substantially smaller than the distance between said aperture and said first and second lenses.

3. A system according to one of claims 1 and 2, further comprising a rotatable pan-head having said carrier disposed thereon.

4. A system according to claim 3, further comprising a plurality of sensors, disposed on one of said carrier and said pan-head.

5. A system as claimed in one of claims 1 and 2, further comprising a pan-and-tilt-head having said carrier disposed thereon.

6. A system as claimed in claim 2, wherein said first and second cameras have different spacing of the main planes on the optical axis.

7. A system according to claim 1, further comprising an optical element rotatably mounted between said aperture and said camera, for rotating the image position.

8. A system according to claim 1 or 2, further comprising a beam splitter for directing light from said light source via the optical path through said aperture and onto the object to be measured.

9. A system according to claim 1 or 2, wherein said light source emits a rotationally symmetrical pattern.

10. A system according to claim 1, further comprising:

a second camera;

a first beam splitter for directing light from said light source via the optical path through said aperture and onto the object to be measured; and a second beam splitter for directing an image path from said aperture to said second camera lens.

11. A system according to claim 2, wherein said first and second lenses have different effective focal lengths.

12. A system according to one of claims 1 and 2, further comprising a plurality of deflection elements in at least one of the paths, for turning the respective path.

13. A system according to one of claims 1 and 2, further comprising a plurality of imaging optical elements in individual ones of said paths.

14. A system according to claim 2, further comprising an optical element rotatably mounted between said aperture and said cameras, for rotating the image positions.

15. A system according to claim 2, further comprising a first beam splitter for directing light from said light source via the optical path through said aperture and onto the object to be measured; and a second beam splitter for directing an image from said aperture to said second camera lens.

16. A system according to claim 7 or 14, further comprising a beam splitter for directing light from said light source via the optical path through said aperture and onto the object to be measured.

17. A system according to claim 7 or 14, wherein said optical element is a Pechan prism.

18. A system according to claim 7 or 14, wherein said optical element is a Dove prism.

19. A system according to claim 7 or 14, wherein said optical element is a system of prisms.

20. A system according to claim 7 or 14, wherein said optical element is a cylindrical lens.

21. A system according to claim 8, wherein said light source emits a rotationally symmetrical pattern.

22. A system according to claim 8, wherein:

said light source emits polarized radiation;

said beam splitter comprises a polarizing beam splitter; and said system further comprises a delay element in at least one of the paths and between said beam splitter and said aperture.

23. A system as claimed in claim 22, wherein said delay element comprises a quarter wave plate.

24. A system according to claim 16, wherein:

said light source emits polarized radiation;

said beam splitter comprises a polarizing beam splitter; and said system further comprises a delay element in at least one of the paths and between said beam splitter and said aperture.

25. A system according to claim 16, wherein said light source emits a rotationally symmetrical pattern.

26. A system according to claim 10, wherein said second beam splitter divides the light selectively by wavelength into a first image path to said first camera lens and a second image path to said second camera lens.

27. A system according to claim 11, wherein at least one of said first and second lenses is adjustable in effective focal length.

28. A system according to claim 4, wherein said plurality of sensors includes an ultra-sound sensor.

29. A system according to claim 5, further comprising a plurality of sensors disposed on one of said carrier and said pan-and-tilt-head.

30. A system as claimed in claim 24, wherein said delay element comprises a quarter wave plate.

31. A system according to claim 29, wherein said plurality of sensors includes an ultra-sound sensor.

32. A system according to claim 30, wherein said second beam splitter divides the light selectively by wavelength into a first image path to said first camera lens and a second image path to said second camera lens.

* * * * *